US011859547B2

(12) United States Patent
Rose et al.

(10) Patent No.: US 11,859,547 B2
(45) Date of Patent: Jan. 2, 2024

(54) TURBINE ENGINE HAVING A BALANCE CAVITY

(71) Applicant: GENERAL ELECTRIC COMPANY, Schenectady, NY (US)

(72) Inventors: Joseph G. Rose, Evendale, OH (US); Atanu Saha, Bengaluru (IN); Bhaskar Nanda Mondal, Bengaluru (IN); Craig W. Higgins, Evendale, OH (US); Darek Zatorski, Evendale, OH (US); Vaibhav Deshmukh M, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/826,321

(22) Filed: May 27, 2022

(65) Prior Publication Data

US 2023/0272744 A1    Aug. 31, 2023

(30) Foreign Application Priority Data

Feb. 25, 2022  (IN) .............................. 202211010224

(51) Int. Cl.
*F02C 7/06* (2006.01)
*F02C 3/06* (2006.01)

(52) U.S. Cl.
CPC .................. *F02C 7/06* (2013.01); *F02C 3/06* (2013.01); *F05D 2240/52* (2013.01); *F05D 2260/15* (2013.01); *F05D 2260/213* (2013.01); *F05D 2260/232* (2013.01); *F05D 2260/605* (2013.01); *F05D 2260/607* (2013.01)

(58) Field of Classification Search
CPC .......... F02C 7/06; F02C 3/06; F05D 2240/52; F05D 2260/15; F05D 2260/213; F05D 2260/232; F05D 2260/605; F05D 2260/607; F01D 3/00
See application file for complete search history.

(56) References Cited

U.S. PATENT DOCUMENTS

| 3,367,256 A | 2/1968 | Townsend et al. | |
|---|---|---|---|
| 4,578,018 A * | 3/1986 | Pope ........................ | F01D 3/04 415/14 |
| 5,167,484 A | 12/1992 | Ponziani et al. | |
| 6,655,906 B1 | 12/2003 | Yuri et al. | |
| 8,087,249 B2 | 1/2012 | Ottaviano et al. | |
| 10,704,391 B1 * | 7/2020 | Brostmeyer .............. | F01D 3/04 |
| 11,274,554 B2 * | 3/2022 | Brault ....................... | F01D 3/04 |
| 2010/0272556 A1 * | 10/2010 | Alecu ....................... | F01D 3/04 415/118 |

(Continued)

FOREIGN PATENT DOCUMENTS

CN    205805736 U    12/2016
DE    102018211907 A1    1/2020

*Primary Examiner* — J. Todd Newton
(74) *Attorney, Agent, or Firm* — McGarry Bair PC

(57) ABSTRACT

A turbine engine having a drive shaft rotatable about an axis, a multi-stage compressor, a turbine section, a thrust bearing, and a balance cavity. The thrust bearing being provided between the drive shaft and at least a portion of the multi-stage compressor section and rotationally supporting the drive shaft. During operation of the turbine engine, a first axial force is applied to the thrust bearing by the drive shaft and a second axial force is applied to the thrust bearing in an opposite direction of the first axial force by the balance cavity.

22 Claims, 2 Drawing Sheets

(56) References Cited

U.S. PATENT DOCUMENTS

| | | |
|---|---|---|
| 2013/0192250 A1 | 8/2013 | Glahn et al. |
| 2016/0010490 A1* | 1/2016 | Schwarz .................. F01D 5/02 415/104 |
| 2016/0160910 A1* | 6/2016 | Gallimore ............. F16C 35/042 384/448 |
| 2018/0045074 A1 | 2/2018 | Sinha et al. |
| 2019/0063222 A1 | 2/2019 | Larson et al. |
| 2020/0072053 A1* | 3/2020 | Brault ....................... F01D 3/00 |
| 2020/0347852 A1 | 11/2020 | Nejedly et al. |

* cited by examiner

TURBINE ENGINE HAVING A BALANCE CAVITY

CROSS-REFERENCE TO RELATED APPLICATIONS

This application claims priority to Indian Provisional Application No. 202211010224, filed Feb. 25, 2022, the contents of which are incorporated herein by reference.

TECHNICAL FIELD

The present subject matter relates generally to a turbine engine, and more specifically to a balance cavity for a turbine engine.

BACKGROUND

Turbine engines, and particularly gas turbine engines, are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. A drive shaft can operably couple the turbine section, the compressor section, and the fan section such that rotation of the turbine section drives the compressor section and the fan section.

At least one thrust bearing can provide between the turbine section and the drive shaft and be used to rotationally support the drive shaft as well as accommodate the fore-to-aft axial force on the drive shaft created by the thrust force from the engine. A balance cavity within the turbine engine can provide a force that opposes the thrust force, thereby reducing the overall magnitude of the axial force acting on the thrust bearing. The balance cavity receives pressurized air from the compressor section, with the pressure opposing the thrust force.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
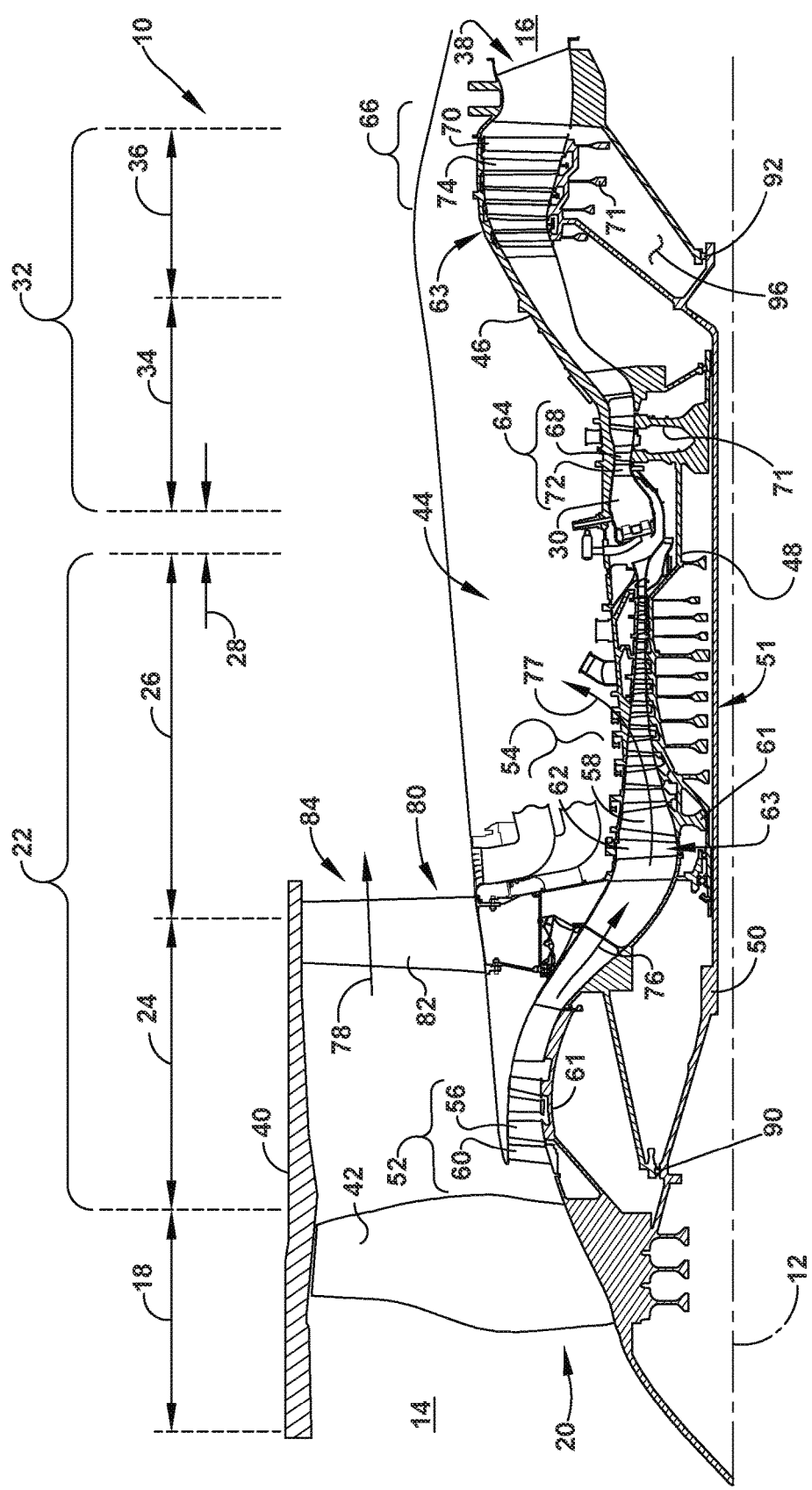
FIG. 1 is a schematic cross-sectional view of a turbine engine in accordance with an exemplary embodiment of the present disclosure, the turbine engine including a multi-stage compressor section.

Aspects of the disclosure herein are directed to a turbine engine including a multi-stage compressor section and a turbine section in axial flow arrangement. The multi-stage compressor section can include at least two rotating blades axially adjacent to a corresponding stationary vane. A stationary vane and an axially adjacent, downstream rotating blade can together define a stage. As such, the term "multi-stage compressor section", as used herein, can refer to a compressor section including two or more stages. A drive shaft can rotational couple the turbine section to the multi-stage compressor section. The drive shaft can rotate about an axis. A thrust bearing can be provided radially between the drive shaft and a portion of the multi-stage compressor section, with respect to the axis. The balance cavity can be fluidly coupled to a downstream portion of the multi-stage compressor section and include a fluid from the downstream portion. During operation of the turbine engine, the turbine engine can rotate the drive shaft, which can rotate the multi-stage compressor section. The overall thrust of the turbine ending can exert fore-to-aft axial force on the drive shaft with respect to the axis, which is ultimately transferred to the thrust bearing. The balance cavity can exert an aft-to-fore axial force, with respect to the axis, on the thrust bearing. The aft-to-fore force exerted by the balancing cavity can oppose and counteract the fore-to-aft force on the thrust bearing.

The balance cavity, as described herein, can counteract or balance an axial force on a thrust bearing that rotationally supports a portion of the drive shaft that is axially forward the turbine section. Under some operating conditions, the turbine engine can experience relatively high axial loads. The balance cavity, as described herein, is used to ensure that the thrust bearing can continue to rotationally support the drive shaft, without failing, under all operating conditions of the turbine engine. For purposes of illustration, the present disclosure will be described with respect to a balance cavity provided within the turbine engine, with the balance cavity being provided near a portion of the multi-stage compressor section. It will be understood, however, that aspects of the disclosure described herein are not so limited and can have general applicability within other engines. For example, the disclosure can have applicability for a balance cavity in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by core casing 46, which can be coupled with the fan casing 40.

A drive shaft 51 can rotationally couple the compressor section 22 and the fan section 18 can be operatively coupled to the turbine section 32. The rotation of the turbine section 32 can transfer a rotational force to the drive shaft 51, which can in turn be transferred to at least one of the compressor section 22 or the fan section 18 to drive the compressor section 22 or fan section 18. The drive shaft 51 can rotate about an axis. In the illustrated turbine engine 10, the drive shaft 51 can rotate about the engine centerline 12.

The drive shaft 51 can include separate spools. As a non-limiting example, the drive shaft 51 can include an HP shaft or spool 48 disposed coaxially about the engine centerline 12 of the turbine engine 10 drivingly connects the HP turbine 34 to the HP compressor 26. As a non-limiting example, the drive shaft 51 can include an LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 can together define the drive shaft 51. The spools 48, 50 are rotatable about the engine centerline 12 and coupled to a plurality of rotatable elements, which can collectively define a rotor.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complimentary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

A set of thrust bearings can rotationally support the drive shaft 51. As a non-limiting example, the set of thrust bearings can include, at least, a forward thrust bearing 90 and an aft thrust bearing 92. The forward thrust bearing 90 can be located axially forward, with respect to the engine centerline 12, from the aft thrust bearing 92. The forward thrust bearing 90 can be provided radially between the drive shaft 51 and the compressor section 22, with respect to the engine centerline 12. The aft thrust bearing 92 can be provided radially between the drive shaft 51 and the turbine section 32, with respect to the engine centerline 12. The turbine engine 10 can include a turbine balance cavity 96 along a portion of the turbine engine 10 confronting the aft thrust bearing 92.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26 via the drive shaft 51. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow exiting the fan section, a bypass airflow 78 bypasses the LP compressor 24 and engine core 44 and exits the turbine engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
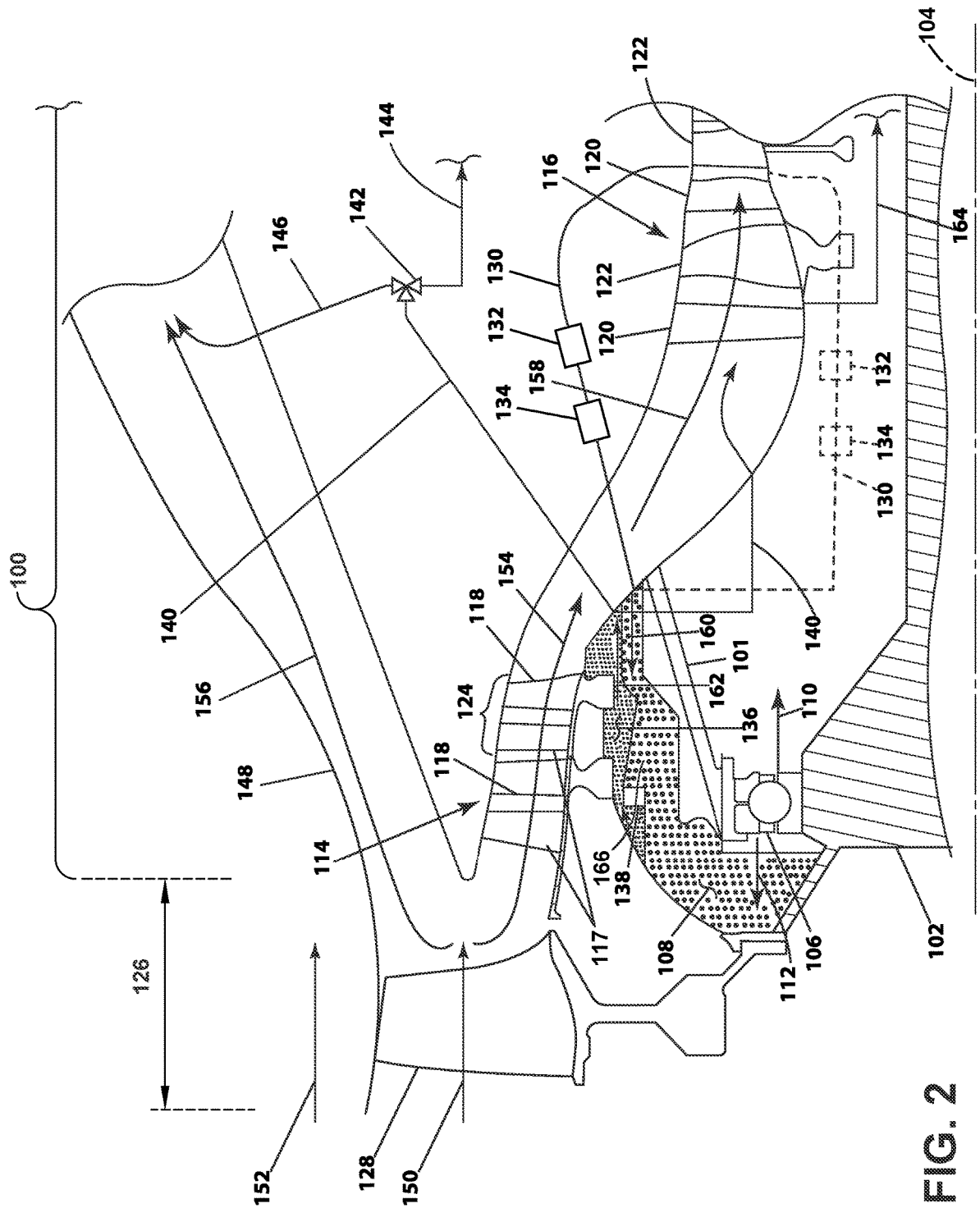
FIG. 2 is a schematic cross-sectional view of a multi-stage compressor section suitable for use within the turbine engine of FIG. 1, the multi-stage compressor section having a thrust bearing rotationally supporting a drive shaft, and a balance cavity located at least partially axially forward of the thrust bearing.

FIG. 2 is a schematic cross-sectional view of a multi-stage compressor section 100 suitable for use as the compressor section 22 of the turbine engine 10 of FIG. 1. The multi-stage compressor section 100 can be rotationally coupled to a drive shaft 102, which can be rotationally coupled to a turbine section (e.g., the turbine section 32) downstream of the multi-stage compressor section 100. The drive shaft 102 can rotate about an axis 104. A thrust bearing 106 can rotationally support the drive shaft 102 and be located between a portion of the drive shaft 102 and a portion of the multi-stage compressor section 100. As a non-limiting example, the thrust bearing 106 can be located between a portion of the drive shaft 102 and a static portion of the multi-stage compressor section 100. A balance cavity 108 can be located at least partially axially fore of the thrust bearing 106, with respect to the axis 104. The balance cavity 108 can be fluidly coupled to a pressurized fluid from a portion of the multi-stage compressor section 100. The balance cavity 108 can be operably coupled to the thrust bearing 106 (e.g., a wall of the balance cavity 108 can be operably coupled to the thrust bearing 106). During operation of the turbine engine a thrust can be generated, which in turn exerts a fore-to-aft axial force on the drive shaft 102. The fore-to-aft axial force can ultimately be transferred to the thrust bearing 106 to define a first axial force 110. The balance cavity 108 can exert an aft-to-fore axial force on the thrust bearing 106, with respect to the axis 104. As a non-limiting example, the balance cavity 108 can exert a second axial force 112 on the thrust bearing 106 that counteracts, opposes, or otherwise balances the first axial force 110. It is contemplated that the first axial force 110 can be larger than the second axial force 112 such that the balance cavity 108 only reduces an overall axial force experienced across the thrust bearing. Alternatively, the first axial force 110 can be equal, but opposite in magnitude, to the second axial force 112 such that the thrust bearing is held in axial equilibrium.

The thrust bearing 106 can be provided between a portion of the drive shaft 102 and a corresponding portion of the multi-stage compressor section 100. As a non-limiting example, the thrust bearing 106 can be provided between a portion of the drive shaft 102 and a stationary component 101 of the multi-stage compressor section 100. The thrust bearing 106 can extend radially between the drive shaft 102 and at least a portion of the multi-stage compressor section 100. The thrust bearing 106 can be any suitable bearing such as, but not limited to, a roller bearing, a ball bearing, a double ball bearing, a tapered roller bearing, a foil/gas bearing, a journal bearing, a spherical bearing, or any combination thereof.

The multi-stage compressor section 100 can include an LP compressor 114 and an HP compressor 116 provided axially downstream of the LP compressor 114, with respect to the axis 104. The LP compressor 114, like the LP compressor 24 of FIG. 1, can include a set of stationary LP compressor vanes 117 and a set of rotating LP compressor blades 118 rotationally coupled to the drive shaft 102. The HP compressor 116, like the HP compressor 26 of FIG. 1, can include a set of stationary HP compressor vane 120 and a set of rotating HP compressor blades 122 rotationally coupled to the drive shaft 102. Each rotating LP compressor blade 118 and rotating HP compressor blade 122 can be provided axially downstream of a corresponding stationary LP compressor vane 117 or stationary HP compressor vane 120, respectively, with respect to the axis 104, and define a corresponding stage of the multi-stage compressor section 100.

A booster section 124 can be defined by a downstream stage of the LP compressor 114. As a non-limiting example, the booster section 124 can be the farthest axially downstream stage of the LP compressor 114.

The balance cavity 108 can include first pressurized fluid defining a first fluid 160. The first fluid 160 can be dispersed throughout the balance cavity 108 as indicated by the dots throughout the balance cavity 108. The balance cavity 108 can be located radially inwardly from at least a portion of the LP, with respect to the axis 104. As a non-limiting example, the balance cavity 108 can be located radially inwardly from the booster section 124, with respect to the axis 104. The balance cavity 108 can be provided within any portion of the multi-stage compressor section 100 axially forward the combustion section. Further, the thrust bearing 106 can be provided along any suitable portion of the multi-stage compressor section 100 along the drive shaft 102 (e.g., along the HP spool 48 or the LP spool 50 of FIG. 1). As such, the balance cavity 108 can be at least partially located along the any portion of the drive shaft 102. The balance cavity 108, as illustrated, is a single balance cavity 108. However, it will be appreciated that the balance cavity 108 can be included within a plurality of balance cavities 108 that are fluidly coupled to one another. As a non-limiting example, the balance cavity 108 can be one balance cavity 108 set of a plurality of balance cavities 108 that are radially, axially, or circumferentially spaced from each other, with respect to the axis 104.

A fan section 126 can be provided upstream of the multi-stage compressor section 100. The fan section 126, like the fan section 18 of FIG. 1, can include at least one rotating fan blade 128. The at least one rotating fan blade 128 can be rotationally coupled to the drive shaft 102. As a non-limiting example, the at least one rotating fan blade 128 can be selectively rotationally coupled to the drive shaft 102 such that the fan section 126 can be selectively coupled or decoupled to the drive shaft 102.

The balance cavity 108 can be fluidly coupled to the multi-stage compressor section 100. As a non-limiting example, the balance cavity 108 can be fluidly coupled to the HP compressor 116. A balance cavity inlet line 130 can fluidly couple the HP compressor 116 to the balance cavity 108. As a non-limiting example, the balance cavity inlet line 130 can be fluidly coupled along or between the first and fourth stage of the HP compressor 116. As a non-limiting example, the balance cavity inlet line 130 can be fluidly coupled to the 1.5 stage of the HP compressor 116 (e.g., between the rotating HP compressor blade 122 and the stationary HP compressor vane 120 of the second stage of the HP compressor 116). The balance cavity inlet line 130 is shown to be fluidly coupled to a radially outer portion of the HP compressor 116, with respect to the axis 104. However, as illustrated by the balance cavity inlet line 130 in phantom lines, the balance cavity inlet line 130 can also or alternatively fluidly coupled to a radially inner portion of the HP compressor 116, with respect to the axis 104. The balance cavity inlet line 130, as described herein, can be one of either of the two balance cavity inlet lines 130 described herein. Alternatively, the balance cavity inlet line 130 can be both of the balance cavity inlet lines 130 fluidly coupled to the radially outer portion of the HP compressor 116 and the radially inner portion of the HP compressor 116, with respect to the axis 104.

The balance cavity inlet line 130 can include at least one component configured to affect a characteristic of a fluid (e.g., the pressurized air from the HP compressor 116) flowing through the balance cavity inlet line 130 and into the balance cavity 108. As a non-limiting example, the balance cavity inlet line 130 can include a heat exchanger 132. The heat exchanger 132 can be fluidly coupled to a coolant (e.g., an ambient airflow, refrigerant, etc.) that has a lower temperature than the fluid within the balance cavity inlet line 130 that flows into the heat exchanger 132. The heat exchanger 132 can effectively cool the fluid by transferring the heat from the fluid and into the coolant. As a non-limiting example, the balance cavity inlet line 130 can include a particle separator 134 configured to remove or otherwise filter out one or more particles from the fluid flowing into the particle separator 134.

A recoup cavity 136 can be fluidly coupled to the balance cavity 108. The recoup cavity 136 can include a second pressurized fluid (e.g., the pressurized air or the first pressurized fluid from the balance cavity 108) defining the second fluid 162. The second fluid 162 can be dispersed throughout the recoup cavity 136 as designated by the dots within the recoup cavity 136. The recoup cavity 136 is configured to capture or otherwise recoup a pressurized fluid from the balance cavity 108 and transfer the pressurized fluid to other portions of the turbine engine. It will be appreciated, however, that the recoup cavity 136 can be integrally formed with the balance cavity 108 such that the balance cavity 108 can transfer at least a portion of the pressurized fluid within the balance cavity 108 to another portion of the turbine engine 10. The recoup cavity 136 can be located at least partially radially outwardly from the balance cavity 108, with respect to the axis 104. The recoup cavity 136 can be located radially inwardly from the booster section 124 with respect to the axis 104. A seal 138 can be provided between the recoup cavity 136 and the balance cavity 108 and define the fluid coupling between the recoup cavity 136 and the balance cavity 108. As a non-limiting example, the seal 138 can be a piston seal. It will be appreciated, however, that the seal 138 can be any other suitable seal such as, but not limited to, a labyrinth seal, a brush seal, a non-contact seal, or any combination thereof.

The recoup cavity 136 can be fluidly coupled to an exhaust line 140. As illustrated, the exhaust line 140 can include two branches. One of the two branches is fluidly coupled to a diverter valve 142. The other of the two branches is fluidly coupled to a portion of the multi-stage compressor section 100 downstream of the LP compressor 114. As a non-limiting example, the exhaust line 140 can be fluidly coupled to a portion of the multi-stage compressor section 100 downstream of the LP compressor 114 and upstream of the HP compressor 116. The diverter valve 142 can selectively fluidly couple the exhaust line 140 to at least one of a turbine line 144 or a bypass line 146. As a non-limiting example, the turbine line 144 can be fluidly coupled to at least one of the turbine section, or the exhaust section (e.g., the exhaust section 38 of FIG. 1). The bypass line 146 can be fluidly coupled to a portion of the turbine engine that is directed away from or otherwise bypasses the combustion section of the turbine engine. As a non-limiting example, the turbine engine can include a secondary flow path 148 that the bypass line 146 is fluidly coupled to. The secondary flow path 148 can be fluidly coupled to or otherwise form a portion of at least one of a thrust reverser, a downstream portion of the turbine engine (e.g., the turbine section or exhaust section) or otherwise be fluidly coupled to an exterior portion of the turbine engine.

The seal 138 can be provided a first radial distance between the axis 104 and a radially inward portion of the seal 138. The booster section 124 can be provided a second radial distance between the axis 104 and a radially inward portion of the booster section 124. The first distance can be smaller than the second distance. The balance cavity 108, the recoup cavity 136, and the seal 138 can extend circumferentially about the axis 104. In other words, the balance cavity 108, the recoup cavity 136, and the seal 138 can define continuous annular components of the turbine engine. Alternatively, at least one of the balance cavity 108, the recoup cavity 136, or the seal 138 can be segmented (e.g., they are one of a plurality of balance cavities 108, recoup cavities 136, or seal 138, respectively) or not extend across an entire circumference of the axis 104.

The turbine engine can include additional balance cavities. As a non-limiting example, the turbine engine can include the turbine balance cavity 96 (FIG. 1) within the turbine section that is configured to apply an opposing axial force on the turbine thrust bearing 92 (FIG. 1) that rotationally supports an aft portion of the drive shaft 102. In other words, the turbine engine, as described herein, can include the balance cavity 108 in conjunction with an additional balance cavity such as those described in the prior art.

During operation of the turbine engine, the turbine section can apply a rotational force to the drive shaft 102, which can in turn rotate at least a portion of multi-stage compressor section 100 and selectively rotate at least a portion of the fan section 126. As the fan section 126 rotates, an inlet airflow 150 can be drawn into the turbine engine. The inlet airflow 150 can be defined by an ambient airflow surrounding the turbine engine. A remaining portion of the ambient airflow that is not drawn in by the fan section 126 can flow around the turbine engine as an exterior airflow 152, which can ultimately merge with an exhaust fluid downstream of the exhaust section. The exhaust fluid and the exterior airflow 152 can, together, define an overall thrust of the turbine engine.

Once past the fan section 126, the inlet airflow 150 can branch in at least two directions. A first portion of the inlet airflow 150 can branch into the multi-stage compressor section 100 to define a primary airflow 154 within a main flow path extending through the multi-stage compressor section 100, the turbine section, and ultimately out the exhaust section. A second portion can flow into the secondary flow path 148 and define a secondary airflow 156. As a non-limiting example, the secondary airflow 156 can be fluidly coupled to a thrust reverser where it can exit the turbine engine in a direction opposing the exterior airflow 152. As a non-limiting example, the secondary airflow 156 can be fluidly coupled to a downstream portion of the turbine engine (e.g., the turbine section, combustion section, or exhaust section), where it can cool various components within the downstream portion of the turbine engine. As a non-limiting example, the secondary airflow 156 can be fluidly coupled to the exterior airflow 152 and merge with the exterior airflow 152 such that the secondary airflow 156 can be used to generate at least a portion of the overall thrust of the turbine engine. As the primary airflow 154 flows through the LP compressor 114, the primary airflow 154 can be compressed or otherwise pressurized and define a compressed primary airflow 158. The compressed primary airflow 158 can flow into the HP compressor 116 where it is compressed or otherwise pressurized further.

The primary airflow 154 can be defined by a first pressure while the compressed primary airflow 158 can be defined by a second pressure, larger than the first pressure. It will be appreciated that the first pressure and the second pressure can vary along the stages of the respective LP compressor 114 and HP compressor 116, respectively.

The balance cavity 108 can be fluidly coupled to the compressed primary airflow 158 through the balance cavity inlet line 130 to define the first fluid 160 within the balance cavity 108. Before flowing into the balance cavity 108, however, the compressed primary airflow 158 within the balance cavity inlet line 130 can be heated, via the heat exchanger 132, or filtered, via the particle separator 134. The first fluid 160 can be defined by the second pressure. At least a portion of the first fluid 160 within the balance cavity 108 can flow into the recoup cavity 136 to define the second fluid 162 at a third pressure, smaller than the second pressure. It is contemplated that the seal 138 can be biased between a high pressure region and a low pressure region such that fluid only flows from the high pressure region and to the low pressure region. In other words, the seal 138 can be biased such that fluid only flows from the balance cavity 108 and into the recoup cavity 136 as the first fluid 160 is at a higher pressure than the second fluid 162.

The second fluid 162 can be exhausted directly into the booster section 124 from the recoup cavity 136. As such, the second fluid 162 can be exhausted form the recoup cavity 136 to the booster section and exhausted via the exhaust line 140 where the second fluid 162 can be exhausted back into the multi stage compressor 100 (e.g., downstream of the LP compressor 114 and upstream of the HP compressor 116), or selectively exhausted into at least one of the secondary flow path 148 via the bypass line 146, or to downstream of or within the turbine section via the turbine line 144.

The overall thrust of the turbine engine can exert the fore-to-aft axial force on the drive shaft 102, which can ultimately be at least partially transferred to the thrust bearing as the first axial force 110. The pressure of the second fluid 162 can be sufficient to exert the second axial force 112 on the thrust bearing that partially counteracts (e.g., is equal but opposite in magnitude) the first axial force 110. As such, the overall axial force experienced across the thrust bearing 106 can be reduced. It is further contemplated that at least a portion of the compressed primary airflow 158 can be fluidly coupled to a turbine balance cavity inlet line 164, which can be provided in the turbine section of the turbine engine and be used to balance or offset an axial force exerted on a thrust bearing in the turbine section from the drive shaft 102.

It is contemplated that during normal operation of the turbine engine, the fan section 126 can be decoupled or at least partially decoupled from the drive shaft 102 to ensure that the fan section 126 is operating at an optimal rotational velocity. At least a portion of the fore-to-aft axial force generated by the overall thrust of the turbine engine can be transferred to or through the fan section 126 when the fan section 126 is coupled to the drive shaft 102. However, when decoupled, a larger fore-to-aft axial force is experienced across the thrust bearing 106 as a portion of the fore-to-aft axial force it is no longer being applied to the fan section 126. This, in turn, increases the overall first axial force 110 that is being exerted on the thrust bearing 106. It is contemplated that the second axial force 112, created by the balance cavity 108, can be sufficient to at least partially counteract the first axial force 110 under all operating conditions, including when the fan section 126 is at least partially decoupled from the drive shaft 102.

Benefits of the present disclosure include a thrust bearing in the compressor section with a longer time-on-wing than a conventional thrust bearing in a conventional compressor section. As used herein, the term "time-on-wing" or "wingtime" can refer to the total amount of time or use that a specific component can have before it must be removed from the turbine engine and replaced, or otherwise repaired. For example, the conventional compressor section does not include a balance cavity. As such, the conventional thrust bearing in the conventional compressor section will experience unchecked (e.g., unopposed) axial loading through the rotational forces of the drive shaft, which over time will wear down the conventional thrust bearing. The turbine engine as described herein, however, includes a thrust bearing that is positioned proximate the balance cavity, which can counteract or otherwise reduce, through an opposing axial force, the axial force on the thrust bearing from the drive shaft. It is contemplated that the use of the balance cavity can reduce the overall axial force experienced along the thrust bearing by 10-35% when compared to conventional thrust bearings in a conventional compressor section. This ultimately increases the overall time-on-wing of the thrust bearing with respect to the time-on-wing of the conventional thrust bearing.

Further benefits include a thrust bearing configured to operate under a wider range of operational conditions of the turbine engine when compared to conventional thrust bearings in the conventional compressor section. As described above, the conventional compressor section does not include the balance cavity. As such, the overall axial force experienced across the conventional thrust bearing will be higher than the overall axial force experienced across the thrust bearing, as described herein, during all operational conditions. This, in turn, means that if the thrust bearing and the conventional thrust bearing were identical, the conventional thrust bearing would experience a larger overall axial force when under high-load conditions (e.g., the decoupling of the fan section) when compared to the thrust bearing as described herein. One way to help ensure that the conventional thrust bearing does not fail, would be to increase the size or material properties of the conventional thrust bearing, thus increasing the overall cost and footprint of the conventional thrust bearing. The thrust bearing, as described herein, can withstand operational conditions of the turbine engine without having to increase the size or material properties of the thrust bearing.

Further yet, the counteraction of the axial forces across the thrust bearing from the drive shaft can allow for increased operation of the turbine engine when compared to a conventional turbine engine including the conventional thrust bearing. It is contemplated that the rotational forces of the drive shaft can be increased as the rotational velocity of the drive shaft increases. The higher the rotational velocity of the drive shaft, the fast the compressor section rotates, which in turn further comprises or pressures the primary airflow. This ultimately increases the overall efficiency or power output of the turbine engine. In other words, this increases the overall thrust of the turbine engine. One drawback, however, of increasing the overall thrust is that the axial force exerted on the thrust bearing is higher. The balance cavity, as described herein, however, can be utilized to at least partially oppose the increased axial load. The at least partial opposition to increased axial loads helps ensure that the turbine engine can operate under conditions where the drive shaft has a relatively high rotational velocity. Further yet, as the pressure of the primary airflow in the compressor section increases, the pressure of the fluid within the balance cavity increases. This means that the axial force exerted on the thrust bearing by the balance cavity also increases. As such, the axial force exerted on the thrust bearing by the balance cavity can at least partially scale with the operational condition of the turbine engine. This ultimately results in a turbine engine with increased power output when compared to the conventional turbine engine.

Further benefits of the present disclosure include a more efficient balance cavity when compared to a conventional balance cavity for a conventional turbine engine. For example, the conventional balance cavity (e.g., one provided within the turbine section) can draw fluid from the compressor section or turbine section to generate the needed axial force. This can result in a 1% to 2% fuel burn penalty of the conventional turbine engine. In other words, the inclusion of the conventional balance cavity can reduce the fuel efficiency of the turbine engine by 1% to 2% compared to a conventional turbine engine without the conventional balance cavity. The balance cavity, as described herein, however, draws a fluid from the compressor section and recirculates (e.g., through the recoup cavity) at least a portion of it back through the turbine engine to be used to generate thrust or cool components of the turbine engine. This, in turn, increased the efficiency of the balance cavity with respect to the conventional balance cavity. The balance cavity, as described herein, can result in a 0.06% to 0.12% fuel burn penalty of the turbine engine.

Further benefits of the present disclosure include a balance cavity provided within the compressor section. Conventional turbine engines do not include a compressor balance cavity for various reasons. First, if a conventional turbine engine were to include a conventional balance cavity (e.g., one found in the turbine section) in the compressor section, then materials of the compressor would have to be upgraded. This is due to the fact that in order for the balance cavity to function, the balance cavity must draw in air from a relatively high-temperature area and transfer it into the balance cavity, which is provided within a relatively low-temperature area with respect to the high-temperature area. The low-temperature area is not rated (e.g., able to withstand) the air from the high-temperature area. As such, the conventional turbine engine would need to increase material properties of the low-temperature area to better withstand the high-temperature. The balance cavity, as described herein, however, can include one or more cooling elements (e.g., the heat exchanger) provided along the balance cavity inlet line. This lowers the temperature of the air that is provided to the balance cavity, thus eliminating the need to change the materials of the compressor section to withstand the relatively high-temperature air. Second, if a conventional turbine engine were to include a conventional balance cavity (e.g., one found in the turbine section) in the compressor section, the air from the balance cavity would not be able to be exhausted without an adverse effect to the turbine engine. For example, the conventional turbine balance cavity is provided near the exhaust section or the LP turbine. As such, the conventional turbine balance cavity can exhaust the fluid within the conventional turbine balance cavity into the LP turbine or the exhaust section without adverse effects. If this same arrangement were to be put in the compressor section (e.g., the balance cavity would directly exhaust to the LP compressor), the efficiency of the compressor section would be adversely affected. The balance cavity, as described herein, however, exhausts to the recoup cavity, which selectively exhausts the fluid within the recoup cavity to locations (e.g., the bypass line, the turbine line, the HP compressor, etc.) that are able to accept the fluid from the balance cavity without adverse effects.

Further yet, the inclusion of the balance cavity provided within the compressor section provides additional benefits. First, the construction of the turbine engine yields additional space at within the compressor section that can be used to package the balance cavity. This space, in the conventional turbine engine, is unused. Second, a conventional balance cavity provided within the turbine section requires two seals (one seal provided along the outer diameter and one seal provided along the inner diameter) in order to properly function. The balance cavity, as described herein, however, only requires a single seal provided along the outer diameter of the balance cavity. This, in turn, results in a reduced weight, additional available space, and lower leakage losses with respect to the conventional balance cavity.

To the extent not already described, the different features and structures of the various aspects can be used in combination, or in substitution with each other as desired. That one feature is not illustrated in all of the examples is not meant to be construed that it cannot be so illustrated but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a drive shaft rotatable about an axis, a multi-stage compressor section circumscribing and driven by the drive shaft, a turbine section circumscribing and operably coupled to the drive shaft, a thrust bearing provided between the drive shaft and at least a portion of the multi-stage compressor section and rotationally supporting the drive shaft, and a balance cavity, located at least partially axially upstream of the thrust bearing, with respect to the axis, and fluidly coupled to at least one of the multi-stages of the multi-stage compressor section, wherein during operation of the turbine engine, a first axial force is applied to the thrust bearing in a fore-to-aft direction by the drive shaft, with respect to the axis, and a second axial force is applied by the balance cavity in an opposing direction to the first axial force.

The turbine engine of any preceding clause, wherein the multi-stage compressor section further comprises a first portion having a first airflow at a first pressure, and a second portion, downstream of the first section, having a second airflow at a second pressure, higher than the first pressure, and wherein the balance cavity is fluidly coupled to the second portion such that at least a portion of the second airflow is supplied to the balance cavity.

The turbine engine of any preceding clause, wherein the balance cavity is located radially inwardly from the first portion, with respect to the axis.

The turbine engine of any preceding clause, wherein the first portion is a low pressure compressor and the second portion is a high pressure compressor.

The turbine engine of any preceding clause, wherein the low pressure compressor comprises a booster section provided along a downstream portion multi-stage of the low pressure compressor, and wherein the balance cavity is located radially inwardly from the booster section, with respect to the axis.

The turbine engine of any preceding clause, wherein the balance cavity is fluidly coupled to the high pressure compressor between a first stage and a fourth stage of the high pressure compressor.

The turbine engine of any preceding clause, wherein the booster section is a farthest axially downstream stage of the low pressure compressor.

The turbine engine of any preceding clause, further comprising a balance cavity inlet line fluidly coupling the balance cavity and either a radially inward portion or a radially outward portion of the second portion, with respect to the axis.

The turbine engine of any preceding clause, further comprising a heat exchanger thermally coupled to the balance cavity inlet line, and configured to cool at least a portion of the second fluid before it enters the balance cavity, and a particle separator fluidly coupled to the balance cavity inlet line and configured to filter a fluid from the second portion before it enters the balance cavity.

The turbine engine of any preceding clause, further comprising a recoup cavity fluidly coupled to the balance cavity.

The turbine engine of any preceding clause, wherein the recoup cavity is provided radially outwardly from balance cavity, with respect to the axis.

The turbine engine of any preceding clause, further comprising a main flow path having a primary airflow and extending through the multi-stage compressor section and the turbine section, and a secondary flow path having a secondary airflow and provided upstream of the multi-stage compressor section, wherein the recoup cavity is configured to exhaust a fluid from the recoup cavity to at least one of a booster section, downstream of or at a downstream portion of the turbine section, the secondary flow path, or to atmosphere.

The turbine engine of any preceding clause, further comprising an exhaust line fluidly coupling the recoup cavity to at least one of the booster section, the turbine section, the secondary flow path, or atmosphere.

The turbine engine of any preceding clause, wherein the exhaust line fluidly couples the recoup cavity to the booster section, the turbine section, and the atmosphere, and selectively fluidly coupled to the multi-stage compressor section or the secondary flow path.

The turbine engine of any preceding clause, wherein the secondary flow path includes an airflow configured to cool a downstream portion of the turbine engine, provide a reverse thrust of the turbine engine, or contribute to a thrust of the turbine engine.

The turbine engine of any preceding clause, further comprising a seal provided between the balance cavity and the recoup cavity.

The turbine engine of any preceding clause, wherein the multi-stage compressor section further comprises a booster section, and wherein the seal is radially spaced from the booster section, with respect to the axis.

The turbine engine of any preceding clause, wherein the booster section and the seal both extend circumferentially about an entirety of the axis, and wherein a first radius is defined between a radially innermost portion of the booster section and axis, and a second radius, smaller than the first radius, is defined between a radially innermost portion of the seal and the axis.

The turbine engine of any preceding clause, further comprising a recoup cavity fluidly coupled to the balance cavity, wherein the balance cavity and the recoup cavity each extend circumferentially about an entirety of the axis.

The turbine engine of any preceding clause, further comprising a turbine balance cavity located within the turbine section, wherein the turbine balance cavity is fluidly coupled to a portion of the multi-stage compressor section.

A multi-stage compressor section comprising a drive shaft rotatable about an axis, a thrust bearing provided between the drive shaft and at least a portion of the multi-stage compressor section and rotationally supporting the drive shaft, and a balance cavity, located at least partially axially upstream of the thrust bearing, with respect to the axis, and fluidly coupled to at least one of the multi-stages of the multi-stage compressor section, wherein during operation of the multi-stage compressor section, a first axial force is applied to the thrust bearing in a fore-to-aft direction by the drive shaft, with respect to the axis, and a second axial force is applied by the balance cavity in an opposing direction to the first axial force.

What is claimed is:

1. A turbine engine comprising:
   a drive shaft rotatable about an axis;
   a multi-stage compressor section circumscribing and driven by the drive shaft;
   a turbine section circumscribing and operably coupled to the drive shaft;
   a thrust bearing provided between the drive shaft and at least a portion of the multi-stage compressor section and rotationally supporting the drive shaft;
   a balance cavity, located at least partially axially upstream of the thrust bearing, with respect to the axis, and fluidly coupled to at least a portion of the multi-stage compressor section; and
   a recoup cavity fluidly coupled to the balance cavity;

wherein during operation of the turbine engine, a first axial force is applied to the thrust bearing in a fore-to-aft direction by the drive shaft, with respect to the axis, and a second axial force is applied by the balance cavity in an opposing direction to the first axial force.

2. The turbine engine of claim 1, wherein the multi-stage compressor section further comprises a first portion having a first airflow at a first pressure, and a second portion, downstream of the first portion, having a second airflow at a second pressure, higher than the first pressure, and wherein the balance cavity is fluidly coupled to the second portion such that at least a portion of the second airflow is supplied to the balance cavity.

3. The turbine engine of claim 2, wherein the balance cavity is located radially inwardly from the first portion, with respect to the axis.

4. The turbine engine of claim 3, wherein the first portion is a low pressure compressor and the second portion is a high pressure compressor.

5. The turbine engine of claim 4, wherein the balance cavity is fluidly coupled to the high pressure compressor between a first stage and a fourth stage of the high pressure compressor.

6. The turbine engine of claim 5, wherein the low pressure compressor comprises a booster section provided along a downstream portion multi-stage of the low pressure compressor, and wherein the balance cavity is located radially inwardly from the booster section, with respect to the axis.

7. The turbine engine of claim 2, further comprising a balance cavity inlet line fluidly coupling the balance cavity and either a radially inward portion or a radially outward portion of the second portion, with respect to the axis.

8. The turbine engine of claim 1, wherein the recoup cavity is provided radially outwardly from balance cavity, with respect to the axis.

9. The turbine engine of claim 1, further comprising:
a main flow path having a primary airflow and extending through the multi-stage compressor section and the turbine section; and
a secondary flow path having a secondary airflow and provided upstream of the multi-stage compressor section;
wherein the recoup cavity is configured to exhaust a fluid from the recoup cavity to at least one of a booster section, downstream of or at a downstream portion of the turbine section, the secondary flow path, or to atmosphere.

10. The turbine engine of claim 9, further comprising an exhaust line fluidly coupling the recoup cavity to at least one of the booster section, the turbine section, the secondary flow path, or atmosphere.

11. The turbine engine of claim 9, wherein the secondary airflow is configured to at least one of cool a downstream portion of the turbine engine, provide a reverse thrust of the turbine engine, or contribute to a thrust of the turbine engine.

12. The turbine engine of claim 1, further comprising:
a seal provided between the balance cavity and the recoup cavity, wherein the multi-stage compressor section further comprises a booster section, and wherein the seal is radially spaced from the booster section, with respect to the axis;
wherein the booster section and the seal both extend circumferentially about an entirety of the axis, and wherein a first radius is defined between a radially innermost portion of the booster section and axis, and a second radius, smaller than the first radius, is defined between a radially innermost portion of the seal and the axis.

13. A turbine engine comprising:
a drive shaft rotatable about an axis;
a multi-stage compressor section circumscribing and driven by the drive shaft, the multi-stage compressor section having a first portion having a first airflow at a first pressure, and a second portion, downstream of the first portion, having a second airflow at a second pressure, higher than the first pressure;
a turbine section circumscribing and operably coupled to the drive shaft;
a thrust bearing provided between the drive shaft and at least a portion of the multi-stage compressor section and rotationally supporting the drive shaft;
a balance cavity, located at least partially axially upstream of the thrust bearing, with respect to the axis, with the balance cavity being fluidly coupled to the second portion such that at least a portion of the second airflow is supplied to the balance cavity;
a balance cavity inlet line fluidly coupling the balance cavity and either a radially inward portion or a radially outward portion of the second portion, with respect to the axis;
a heat exchanger thermally coupled to the balance cavity inlet line, and configured to cool at least a portion of the second airflow before it enters the balance cavity; and
a particle separator fluidly coupled to the balance cavity inlet line and configured to filter a fluid from the second portion before it enters the balance cavity;
wherein during operation of the turbine engine, a first axial force is applied to the thrust bearing in a fore-to-aft direction by the drive shaft, with respect to the axis, and a second axial force is applied by the balance cavity in an opposing direction to the first axial force.

14. The turbine engine of claim 13, wherein the multi-stage compressor section further comprises a first portion having a first airflow at a first pressure, and a second portion, downstream of the first portion, having a second airflow at a second pressure, higher than the first pressure, and wherein the balance cavity is fluidly coupled to the second portion such that at least a portion of the second airflow is supplied to the balance cavity.

15. The turbine engine of claim 14, wherein the balance cavity is located radially inwardly from the first portion, with respect to the axis.

16. The turbine engine of claim 15, wherein the first portion is a low pressure compressor and the second portion is a high pressure compressor.

17. The turbine engine of claim 16, wherein the low pressure compressor comprises a booster section provided along a downstream portion multi-stage of the low pressure compressor, and wherein the balance cavity is located radially inwardly from the booster section, with respect to the axis.

18. The turbine engine of claim 17, further comprising a balance cavity inlet line fluidly coupling the balance cavity and either a radially inward portion or a radially outward portion of the second portion, with respect to the axis.

19. A turbine comprising:
a drive shaft rotatable about an axis;
a multi-stage compressor section circumscribing and driven by the drive shaft;
a turbine section circumscribing and operably coupled to the drive shaft;

a thrust bearing provided between the drive shaft and at least a portion of the multi-stage compressor section and rotationally supporting the drive shaft;

a balance cavity, located at least partially axially upstream of the thrust bearing, with respect to the axis, and fluidly coupled to at least a portion of the multi-stage compressor section; and a recoup cavity fluidly coupled to the balance cavity, wherein the balance cavity and the recoup cavity each extend circumferentially about an entirety of the axis;

wherein during operation of the turbine engine, a first axial force is applied to the thrust bearing in a fore-to-aft direction by the drive shaft, with respect to the axis, and a second axial force is applied by the balance cavity in an opposing direction to the first axial force.

20. A turbine engine comprising:

a drive shaft rotatable about an axis;

a multi-stage compressor section circumscribing and driven by the drive shaft;

a turbine section circumscribing and operably coupled to the drive shaft;

a thrust bearing provided between the drive shat and at least a portion of the multi-stage compressor section and rotationally supporting the drive shaft;

a balance cavity, located at least partially axially upstream of the thrust bearing, with respect to the axis, a fluidly coupled to at least a portion of the multi-stage compressor section; and a turbine balance cavity located within the turbine section, wherein the turbine balance cavity is fluidly coupled to a portion of the multi-stage compressor section;

wherein during operation of the turbine engine, a first axial force is applied to the thrust bearing in a fore-to-aft direction by the drive shaft, with respect to the axis, and a second axial force is applied by the balance cavity in an opposing direction to the first axial force.

21. A multi-stage compressor section comprising:

a first portion and a second provided downstream of the first portion;

a drive shaft rotatable about an axis;

a thrust bearing provided between the drive shaft and at least a portion of the multi-stage compressor section and rotationally supporting the drive shaft;

a balance cavity, located at least partially axially upstream of the thrust bearing, with respect to the axis, and fluidly coupled to at least a portion of the multi-stage compressor section; and a balance cavity inlet line fluidly coupling the balance cavity with the second portion, the balance cavity inlet line having an inlet provided along a radially inner portion of the second portion, with respect to the axis;

wherein during operation of the multi-stage compressor section, a first axial force is applied to the thrust bearing in a fore-to-aft direction by the drive shaft, with respect to the axis, and a second axial force is applied by the balance cavity in an opposing direction to the first axial force.

22. The multi-stage compressor of claim 21, wherein the first portion is a low-pressure compressor and the second portion is a high-pressure compressor, with the balance cavity being provided radially inward from the low-pressure compressor.

* * * * *